Figure 1:
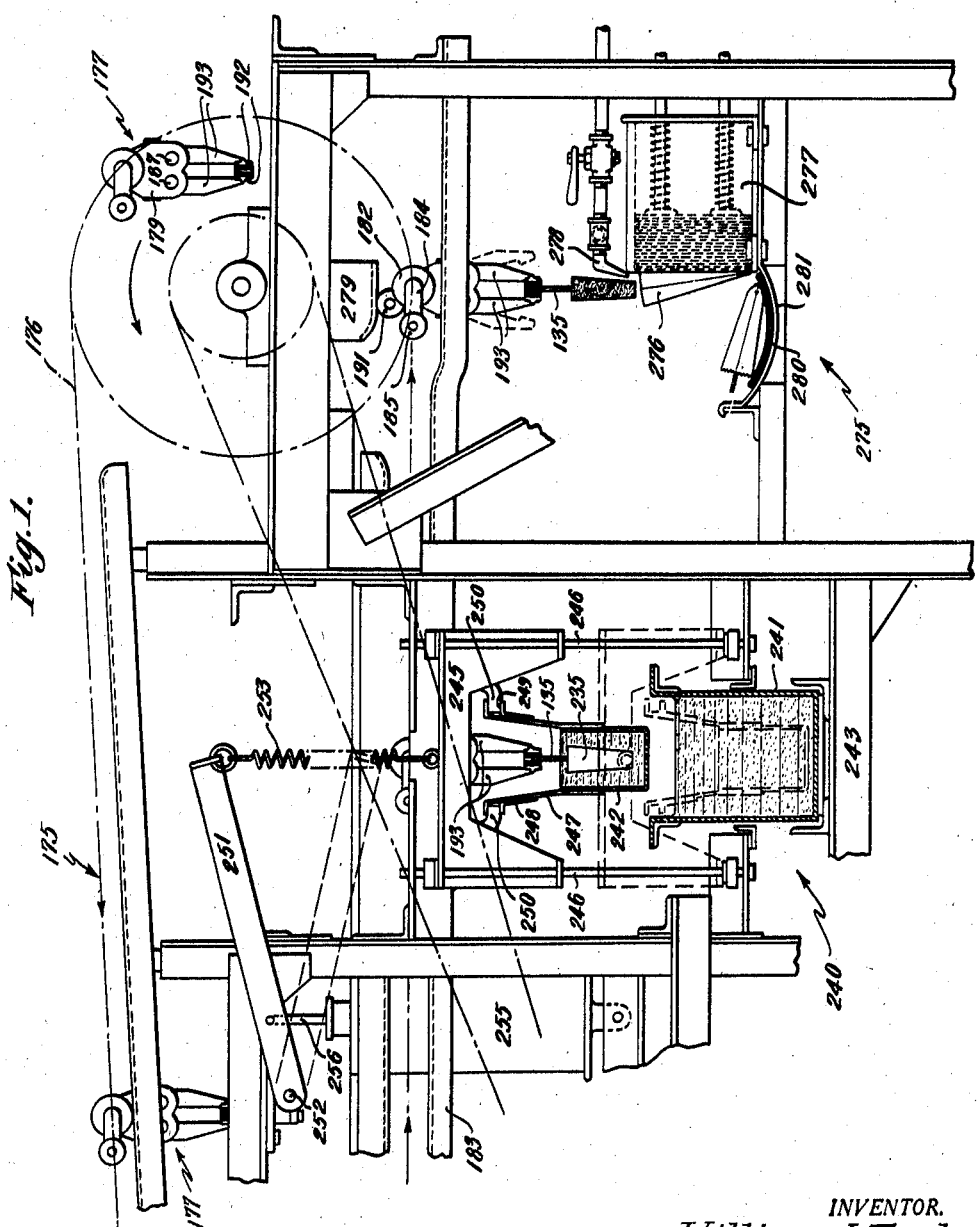

July 19, 1938. W. J. TAYLOR 2,124,387
MACHINE FOR MAKING FROZEN CONFECTIONS
Original Filed Dec. 13, 1935 3 Sheets-Sheet 1

INVENTOR.
William J. Taylor,
BY
Roberts, Cushman & Woodberry
ATTORNEYS.

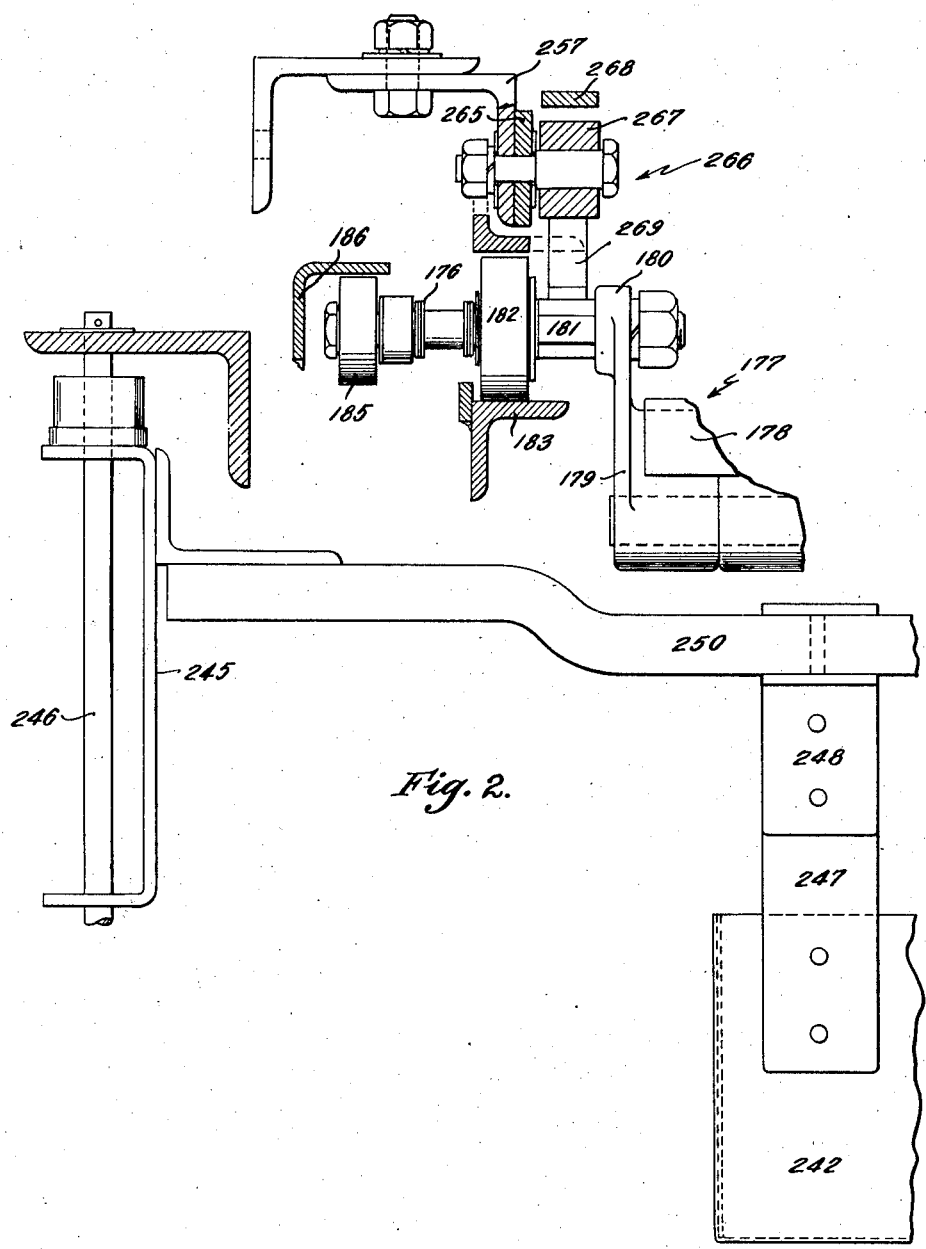

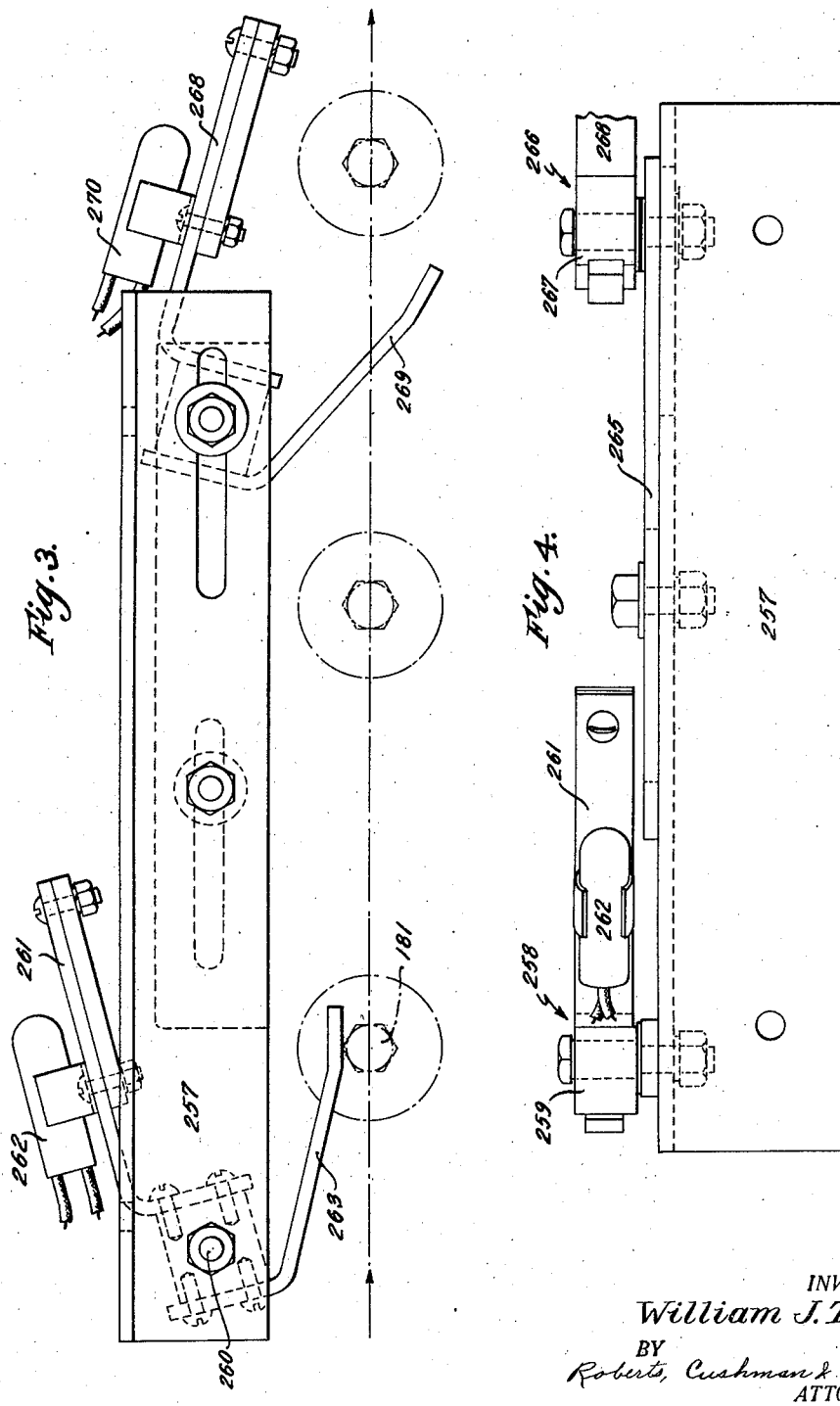

Patented July 19, 1938

2,124,387

UNITED STATES PATENT OFFICE 2,124,387

MACHINE FOR MAKING FROZEN CONFECTIONS

William J. Taylor, Syracuse, N. Y., assignor to The Lamson Company, Syracuse, N. Y., a corporation of Massachusetts Original application December 13, 1935, Serial No. 54,166. Divided and this application January 18, 1937, Serial No. 121,114

2 Claims. (Cl. 91—4)

This invention relates to an improvement in a machine for making frozen confections each confection consisting of an edible block with a stick frozen therein and being suitably protected as by means of a bag. The patent to Robb No. 1,960,456, dated May 29, 1934, illustrates a machine of this general type.

This application is a division of application Serial No. 54,166 filed December 13, 1935, which sets forth a machine provided with the instrumentalities by which the following steps are carried out; first, filling each of a plurality of molds with a measured quantity of ice cream or an equivalent edible substance, in a fluid or semi-viscous condition; second, freezing the contents of the molds to form confections; third, inserting a stick into each confection during the freezing thereof; fourth, heating the walls of the molds sufficiently to permit the withdrawal of the confections therefrom by grippers or similar means; fifth, dipping the confections into a tank by which they are coated with chocolate or similar material; and sixth, inserting the coated confections into bags or cartons.

The object of the invention to which this application is directed resides in the structure and mode of operation of the instrumentalities by which the confections are coated with chocolate or similar material and the coated confections are packaged by inserting them into bags or cartons as will appear from a consideration of the following description and of the drawings which form a part thereof and in which Fig. 1 is a side elevation partly in section of a portion of the machine illustrating the units by which the coating and packaging of the confections are performed;

Fig. 2 is an enlarged cross sectional view of a portion of the confection conveyor and the coating mechanism; and Figs. 3 and 4 are side elevation and plan views, respectively, of the switch mechanism controlling the operation of the coating unit.

The confections 235 to be coated are of edible material in which are secured, by freezing, sticks 135 the upper ends of which project above the top of the confections. A gripper conveyor 175 comprising a pair of chains 176 (only one being here shown) between which a plurality of equally spaced gripper carriers 177 are suspended. Each gripper carrier comprises a channular cross plate 178 mounted on end blocks 179 from which arms 180 extend upwardly above the cross plate 178. The arms 180 are secured to pins 181 carrying rollers 182 adapted to ride on tracks 183. Fixed to the outer end of one pin 181 is an arm 184 carrying a roller 185 adapted to travel in a track 186 mounted on the machine frame adjacent and parallel to one of the tracks 183. A pair of rock shafts 187 are supported at their ends in the blocks 179 below and parallel to the cross plate 178. Said shafts are connected to insure unisonal rocking in opposite directions and there is fixed to one shaft an arm carrying a roller 191. A pair of gripper jaws 192 are secured by arms 193 to the shafts and are normally held closed.

The jaws 192 seize the sticks 135 of the confections and advance them to a coating unit 240 which comprises a fixed tank 241 and a vertically reciprocable tank 242. The tank 241 is rigidly mounted on angle bars 243 carried by the machine frame. The tank 242 is supported from a pair of plates 245 vertically reciprocable on rods 246 at opposite sides of the machine frame. Secured to the sides of the tank 242 are sets of straps 247 and 248 providing pockets 249 in which are received the edges of cross bars 250 carried by the plates 245. The tank 242 is raised and lowered by arms 251 fixed at one end to a cross bar 252 and connected at the other end to the plates 245 by a coil spring 253. These tanks contain a confection coating fluid and the tank 242 is raised at regular intervals to receive the confections carried by each pair of gripper jaws and is then lowered into the tank 241.

Various means for operating the tank may be employed. That here shown comprises a solenoid 255 having a piston 256 connected to one of the arms 251 and actuated automatically by the gripper conveyor. Fixed upon a side bar of the machine frame is an angle plate 257 to which a switch 258 is pivotally supported. The switch comprises a block 259 rockable on a pin 260, an arm 261 on which a mercury switch unit 262 is mounted and a second arm 263. The arms 261 and 263 are secured to the block 259 with the arm 263 normally suspended in the path of travel of the gripper carriers so that it is tripped by the roller carrying pins 181 thereon. A plate 265 secured to the angle plate 257 by bolt and slot assemblies carries a switch 266. The switch 266 is similar in construction and operation to the switch 258 having a block 267, arms 268 and 269 and a mercury switch unit 270 the unit being mounted on the arm 268 and the arm 269 being normally in the path of travel of the pins 181 of the gripper carriers.

The switches 258 and 266 which form parts of a circuit including the solenoid 255 and a battery or other source of electric current (not shown), are normally open and are closed upon the tripping of the arms 263 and 269 respectively. Obviously however the circuit will only be closed and the solenoid energized when both switches are closed at the same time. As shown in Fig. 3 the switches are so spaced that they will be tripped concomitantly by alternate gripper carriers and that at such time the intermediate carrier will be over the tanks. It will further be noted that the switch 266 is tripped in advance of the switch 258.

As the gripper conveyor 175 advances and each carrier with its load of confections passes over the tank 242, the carriers next ahead and behind trip the switches causing the solenoid to raise the tank so that the confections are plunged therein and coated by the contents thereof. The tank retains this position only just long enough to coat the confections and then, upon the opening of the circuit by the release of the switch 266, drops back into the tank 241 below the liquid level thereof so that the coating material removed from the tank 242 by the confections is replaced.

The confections are then carried to a bagging or wrapping unit 275. As shown in Fig. 1 bags 276 are yieldably advanced in magazines 277 and the mouths of the leading bags opened by jets of air from nozzles 278 directly below the confections on the gripper carriers. As each carrier approaches this position the roller 191 thereof is tripped by a shoe 279 and the jaws are opened to permit the confections to drop into the opened bags. The weight of the confections disengages the bags from the magazines and causes them to fall on to a conveyor belt 280 traveling in a trough 281. The bagged confections are delivered to a suitable destination by the conveyor which travels at such speed that each row of the confections is removed before the succeeding row is bagged.

I claim:

1. In a machine of the class described comprising a conveyor provided with gripper carriers, the grippers being adapted to seize the sticks projecting from frozen confections and means for continuously advancing the conveyor and the confections suspended from the gripper carriers along a path of travel, a fixed tank of fluid for coating the confections over which the confections are carried, a vertically reciprocable tank normally within the fixed tank and filled by the fluid therein and means for raising said second named tank to receive momentarily and apply a coating to the confections suspended from a gripper carrier, said last named means being actuated concomitantly by the gripper carriers next ahead and behind the first named gripper carrier.

2. In a machine of the class described comprising a conveyor provided with gripper carriers, the grippers being adapted to seize the sticks projecting from frozen confections, and means for continuously advancing the conveyor and the confections suspended from the gripper carriers along a path of travel, a fixed tank of fluid for coating the confections over which the confections are carried, a vertically reciprocable tank normally within the fixed tank and filled by the fluid therein and means for raising said second named tank to receive momentarily and apply a coating to the confections suspended from a gripper carrier, said last named means including a solenoid and switches tripped by the carriers, the concomitant tripping of the switches by the gripper carriers next ahead and behind the first named gripper carrier energizing the solenoid to raise the tank.

WILLIAM J. TAYLOR.